(12) United States Patent
Vadstrup

(10) Patent No.: US 7,043,395 B2
(45) Date of Patent: May 9, 2006

(54) METHOD FOR DETECTING THE MAGNETIC FLUX THE ROTOR POSITION AND/OR THE ROTATIONAL SPEED

(75) Inventor: Pierre Vadstrup, Tilst (DK)

(73) Assignee: Grundfos A/S, (DK)

(*) Notice: Subject to any disclaimer, the term of this patent is extended or adjusted under 35 U.S.C. 154(b) by 238 days.

(21) Appl. No.: 10/621,642

(22) Filed: Jul. 17, 2003

(65) Prior Publication Data
US 2004/0060348 A1 Apr. 1, 2004

(30) Foreign Application Priority Data
Jul. 18, 2002 (EP) .................................. 02015956

(51) Int. Cl.
G01P 3/00 (2006.01)
G06F 15/00 (2006.01)
(52) U.S. Cl. ...................................... 702/145; 702/189
(58) Field of Classification Search ................ 702/145, 702/189, 85, 86, 94; 310/254, 261
See application file for complete search history.

(56) References Cited
U.S. PATENT DOCUMENTS
5,729,102 A 3/1998 Gotou et al.
6,373,211 B1 4/2002 Henry et al.
6,396,236 B1 5/2002 Luukko
6,465,975 B1 10/2002 Naidu
2002/0171311 A1* 11/2002 Fujiwara et al. ............ 310/184
2003/0025475 A1* 2/2003 Won et al. .................. 318/701

FOREIGN PATENT DOCUMENTS
EP 0 784 378 A2 7/1997
WO WO 99 65137 A1 12/1999
WO WO 01 20751 A2 3/2001

* cited by examiner

Primary Examiner—Marc S. Hoff
Assistant Examiner—Paul Kim
(74) Attorney, Agent, or Firm—Jacox Meckstroth & Jenkins

(57) ABSTRACT

The method serves for detecting the magnetic flux, the rotor position and/or the rotational speed of the rotor in a single- or multiphase permanent magnet- or -synchronous motor or -generator using the stator voltage equations $L \cdot i_\alpha = -R \cdot i_\alpha + p \cdot \omega \cdot \psi_{m\beta} + u_\alpha$   Equation (1)

$L \cdot i_\beta = -R \cdot i_\beta - p \cdot \omega \cdot \psi_{m\alpha} + u_\beta$   Equation (2)

It is characterized in that with the evaluations one takes into account the energy conditions of the rotor, by which means one may achieve an accuracy which is considerably greater than known methods.

20 Claims, 3 Drawing Sheets

METHOD FOR DETECTING THE MAGNETIC FLUX THE ROTOR POSITION AND/OR THE ROTATIONAL SPEED

BRIEF DESCRIPTION OF THE INVENTION

The invention relates to a method for detecting a magnetic flux, a rotor position and/or a rotational speed of the rotor in a single-phase- or multi-phase-permanent magnet or -synchronous motor or -generator.

Magnetic flux, rotor position and rotational speed are defined by the stator voltage equations known per se:

$$L \cdot \dot{i}_\alpha = -R \cdot i_\alpha + p \cdot \omega \cdot \psi_{m\beta} + u_\alpha \quad \text{Equation (1)}$$

$$L \cdot \dot{i}_\beta = -R \cdot i_\beta - p \cdot \omega \cdot \psi_{m\alpha} + u_\beta \quad \text{Equation (2)}$$

in which
- L is the inductance
- $i_\alpha$ a current in the direction $\alpha$
- $i_\beta$ a current in the direction $\beta$
- $\dot{i}_\alpha$ a derivative with respect to time of the current in the direction $\alpha$
- $\dot{i}_\beta$ a derivative with respect to time of the current in direction of $\beta$
- R an ohmic resistance
- p a pole pair number
- $\omega$ a rotational speed of the rotor
- $\psi_{m\alpha}$ a magnetic flux in the direction $\alpha$
- $\psi_{m\beta}$ a magnetic flux in the direction $\beta$
- $u_\alpha$ a voltage in direction $\alpha$
- $u_\beta$ a voltage in the direction $\beta$ As is deduced from these equations, the previously mentioned variables may be evaluated if the voltage and current in the directions $\alpha$ and $\beta$ are known. The latter may also be evaluated as electrical data in a simple manner. According to the state of the art, this is only possible if the magnitude of the magnetic flux is assumed to be constant since otherwise the equation system may not be unambiguously solved due to too many unknown variables. Since the magnetic flux is indeed not constant, but the magnitude varies with time and rotor position, this known method is erroneous, which leads to the fact that it is only suitable in a limited manner for control and regulation processes of the motor.

Today modern multi-phase permanent magnet motors are often provided with power electronics, i.e. the commutation is effected electronically. For the control however the knowledge of the current rotor position is very significant, not only to be able to operate the motor with a high efficiency, but also in order to protect the sensitive components of the power electronics and to achieve an improved dynamic behavior of the drive.

The measurement of the rotational speed may however be effected via an external measurement arrangement in a comparatively simple manner. The exact evaluation of the rotor position however is complicated.

On the other hand where possible one tries to evaluate these values by calculation since on account of the digital electronics which are regularly present in the control and regulation part of the motor electronics, suitable computing power is available or may be made available with little effort. Suitable programs for calcuated evaluation could also be integrated by software implementation without much effort.

Against this background it is an object of the invention to provide a system and method of the known type for detecting the magnetic flux, the rotor position, and/or the rotational speed of the rotor in a single-phase or multi-phase-permanent magnet motor or -synchronous motor or -generator.

SUMMARY OF THE INVENTION

This object is achieved by the features specified in claim 1. Advantageous embodiments of the invention are specified in the dependent claims as well as the subsequent description.

The basic concept of the present invention is to apply the stator voltage equations known per se with a method for detecting the previously mentioned variables, but however in contrast to the state of the art not to set the magnetic flux constant, but to also include the energy relations in the magnet of the rotor in order thus to be able to determine the previously mentioned variables, in particular the rotor position or its derivative with respect to time and rotational speed in a more exact manner.

The present invention may be applied to single-phase- as well as multi-phase permanent magnet or -synchronous motors as well as corresponding -generators. Inasmuch as it concerns single-phase motors and generators, one of the two stator voltage equations drops away. Otherwise with two-phase or multi-phase motors or generators one computes with the stator voltage equation for two-phase motors and generators, wherein with three-phase and multi-phase motors one reduces or transforms by calculation to a two-phase model in a manner known per se. Inasmuch as this is concerned then values detected with measurement technology must be accordingly converted to a two-phase model.

The present invention in particular is envisaged for permanent magnet motors, but in the same manner may also be applied to synchronous motors or generators, wherein with synchronous motors or generators the magnet formed by the rotor coil takes the place of the permanent magnet. In this context the generator application may also be the case in combination with the control of motors operated with power electronics if with generator operation these supply to the mains in order to determine the rotor position of the mains generator.

The method according to the invention may also be used for generators, for example with the control.

These and other objects and advantages of the invention will be apparent from the following description, the accompanying drawings and the appended claims.

BRIEF DESCRIPTION OF ACCOMPANYING DRAWINGS

Figure 1:
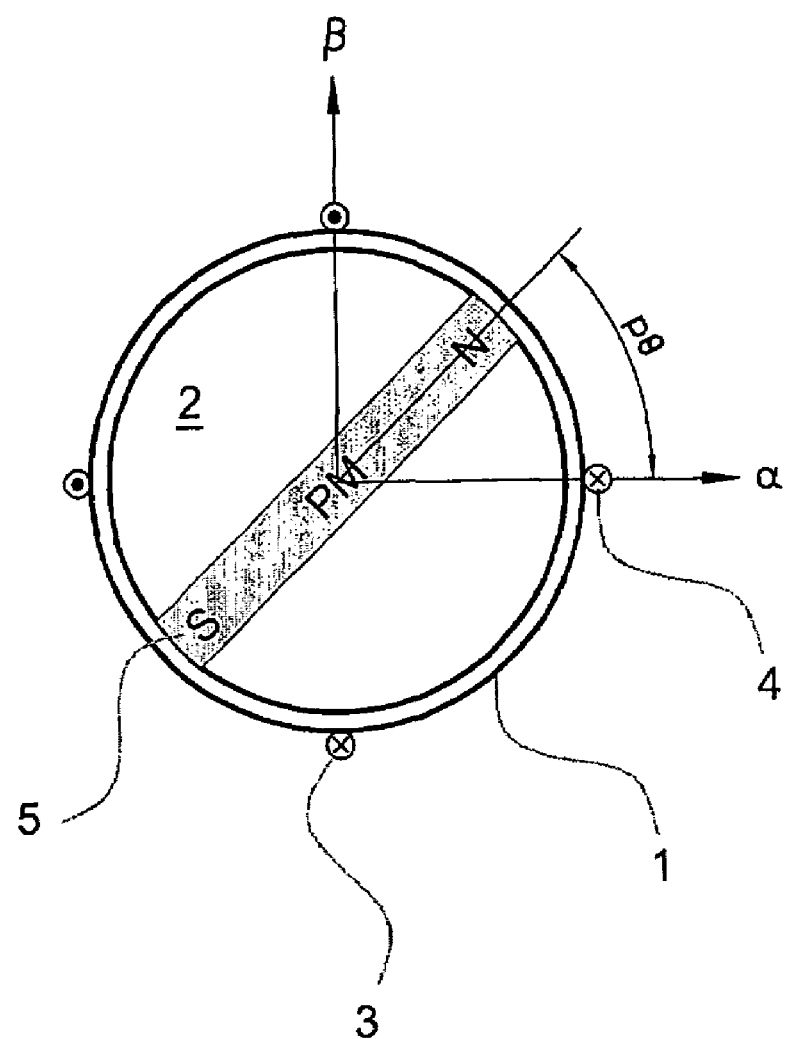
FIG. 1 is an illustrative view of a two-phase permanent magnet motor according to one embodiment.

In FIG. 1 there is shown such a two-phase permanent magnet motor, there are provided two phases $\alpha$ and $\beta$ in a motor which are shifted by 90° to one another which are symbolized by two coils 3 and 4. Within this stator 1 there is arranged a rotor which comprises a permanent magnet 5 with a diametrical polarity distribution N and S which is rotatingly mounted within the stator 1.

In order to take into account the energy conditions in the magnet 5 of the rotor 2 the following equations (3) and (4) are applied.

$$\dot{\psi}_{m\alpha} = -p \cdot \omega \cdot \psi_{m\beta} \quad \text{Equation (3)}$$

$$\dot{\psi}_{m\beta} = p \cdot \omega \cdot \psi_{m\alpha} \quad \text{Equation (4)}$$

wherein $\dot{\psi}_{m\alpha}$ is the derivative with respect to time of $\psi_{m\alpha}$ and $\dot{\psi}_{m\beta}$ the derivative with respect to time of $\psi_{m\beta}$.

The particularity of these rotor energy equations lies in the fact that the magnetic flux in the β-direction enters the derivative with respect to time of the magnetic flux in the α-direction and vice versa.

Figure 2:
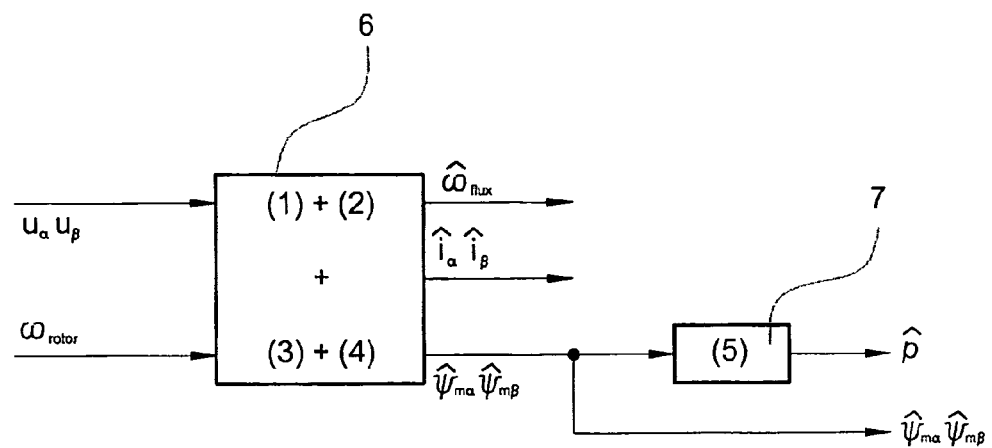
FIG. 2 is a schematic view of an embodiment.

By way of this there results a computational motor model with which for example as illustrated by way of FIG. 2 one may determine electrical, magnetic and/or mechanical values of the motor.

In the following, in the motor models represented as block diagrams a computed value is in each case represented by ^ whereas with the values which are not characterized by ^ it is the case of measured values.

It is to be understood that from the initially mentioned variables (magnetic flux, rotor position, rotational speed) one may in each case evaluate one if one uses the motor model symbolized by the block 6 in FIG. 2. This motor model symbolized by the block 6 consists of the equations (1) to (4) with which one of the previously mentioned values may be evaluated by calculation in a relatively exact manner.

With the method according to FIG. 2 the voltages $u_\alpha$ und $u_\beta$, i.e. the stator voltages in the α and β direction are measured or computed in another manner, just as ω the rotational speed. These variables are substituted into the equations (1) and (4), so that one may evaluate by calculation the speed of the magnetic flux $\omega_{flux}$, the motor currents $i_\alpha$ in the direction α and $i_\beta$ in the direction β as well as the magnetic flux $\psi_\alpha$ in direction α und $\psi_\beta$ in the direction β. The corresponding values evaluated by calculation are characterized by ^:

$$L \cdot \hat{i}_\alpha = -R \cdot \hat{i}_\alpha + p \cdot \hat{\omega} \cdot \hat{\psi}_{m\beta} + u_\alpha \quad \text{Equation (1)}$$

$$L \cdot \hat{i}_\beta = -R \cdot \hat{i}_\beta - p \cdot \hat{\omega} \cdot \hat{\psi}_{m\alpha} + u_\beta \quad \text{Equation (2)}$$

$$\dot{\hat{\psi}}_{m\alpha} = -p \cdot \hat{\omega} \cdot \hat{\psi}_{m\beta} \quad \text{Equation (3)}$$

$$\dot{\hat{\psi}}_{m\beta} = p \cdot \hat{\omega} \cdot \hat{\psi}_{m\alpha} \quad \text{Equation (4)}$$

From the magnetic flux $\psi_\alpha$ in the direction α and $\psi_\beta$ in the direction β then by way of an angle calculator 7 which applies the geometric designation according to $$\rho = \frac{1}{p} \cdot \text{Arctg}\left(\frac{\psi_{m\beta}}{\psi_{m\alpha}}\right) \quad \text{Equation (5)}$$

one may evaluate the position ρ of the magnetic flux. In this basic motor model 6 the rotor position is determined by equating with the position of the magnetic flux assuming that these always agree in a real manner.

Figure 3:
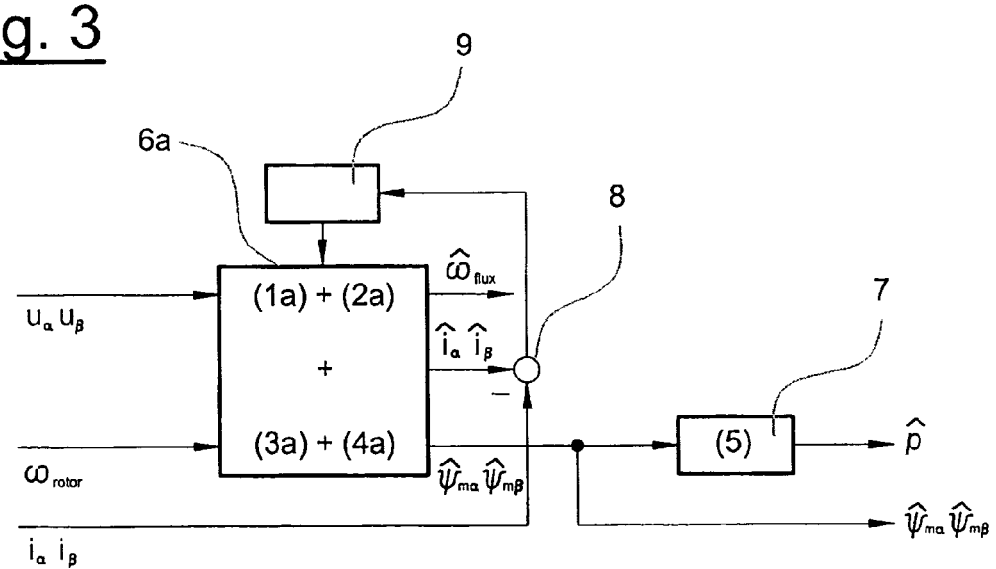
FIG. 3 is a schematic view of another embodiment showing measured stator currents in the $\alpha$ and $\beta$-direction in comparison to the computed currents in the $\alpha$ and $\beta$ direction provided as a correction term.

Since this motor model 6 in its simplest form only represents an approximation by calculation of the actual values, it may be improved by further measures. Such an improvement for example is represented by way of the method shown in FIG. 3. As FIG. 3 shows here the basic motor model 6 consisting of the equations (1) and (4) is taken as a basis, wherein the stator voltages u in directions α und β, $u_\alpha$ und $u_\beta$ as well as the rotor speed ω flow into the model for example as measured variables. In contrast to the method according to FIG. 2 in the model 6a according to FIG. 3 however the stator current in the α- und β-direction, thus $i_\alpha$ and $i_\beta$ are additionally determined, joined by subtraction with the calculated current values $\hat{i}_\alpha$ and $\hat{i}_\beta$ determined by the motor model 6a (this is represented in FIG. 3 the subtraction junction 8) and the value resulting therefore is led to a correction term 9 which also flows into the motor model 6a in a correcting manner. In this manner one creates a refined motor model 6a and thus an improved method for evaluating the previously mentioned values which consists of the equations (1a), (2a), (3a) und (4a):

$$L \cdot \hat{i}_\alpha = -R \cdot \hat{i}_\alpha + p \cdot \omega \cdot \psi_{m\beta} + u_\alpha + \upsilon_{1\alpha} \quad \text{Equation (1a)}$$

$$L \cdot \hat{i}_\beta = -R \cdot \hat{i}_\beta - p \cdot \omega \cdot \psi_{m\alpha} + u_\beta + \upsilon_{1\beta} \quad \text{Equation (2a)}$$

$$\dot{\psi}_{m\alpha} = -p \cdot \omega \cdot \psi_{m\beta} + \upsilon_{2\alpha} \quad \text{Equation (3a)}$$

$$\dot{\psi}_{m\beta} = p \cdot \omega \cdot \psi_{m\alpha} + \upsilon_{2\beta} \quad \text{Equation (4a)}$$

in which $\upsilon_{1\alpha}, \upsilon_{1\beta}, \upsilon_{2\alpha}, \upsilon_{2\beta}$ are correction terms.

In the method according to FIG. 3 the measured stator currents in the α and β-direction in comparison to the computed currents in the α and β direction are provided as a correction term. It is to be understood that this is only to be understood as an example, in the same manner the motor currents may flow into the motor model 6 or 6a and the motor voltages evaluated by calculation and as the case may be inputted as a correction term by comparison to the actual voltages. One may also provide several correction terms which are constructed based on several electrical variables.

For the previously described method represented as an example by way of FIG. 3 there thus for example results the following equations $$L \cdot \hat{i}_\alpha = -R \cdot \hat{i}_\alpha + p \cdot \hat{\omega} \cdot \hat{\psi}_{m\beta} + u_\alpha + \upsilon_{1\alpha} \quad (1a)$$

$$L \cdot \hat{i}_\beta = -R \cdot \hat{i}_\beta - p \cdot \hat{\omega} \cdot \hat{\psi}_{m\alpha} + u_\beta + \upsilon_{1\beta} \quad (2a)$$

$$\dot{\hat{\psi}}_{m\alpha} = -p \cdot \hat{\omega} \cdot \hat{\psi}_{m\beta} + \upsilon_{2\alpha} \quad \text{Equation (3a)}$$

$$\dot{\hat{\psi}}_{m\beta} = p \cdot \hat{\omega} \cdot \hat{\psi}_{m\alpha} + \upsilon_{2\beta} \quad \text{Equation (4a)}$$

in which $\upsilon_{1\alpha}, \upsilon_{1\beta}, \upsilon_{2\alpha}, \upsilon_{2\beta}0$ are correction terms wherein the correction terms are formed by a correction factor and the difference of the computed electrical values and the measured electrical values as follows:

$$\upsilon_{1\alpha} = K_i \cdot (\hat{i}_\alpha - i_\alpha)$$

$$\upsilon_{2\alpha} = -K_\psi \cdot (\hat{i}_\beta - i_{62})$$

$$\upsilon_{1\beta} = K_i \cdot (\hat{i}_\beta - i_\beta)$$

$$\upsilon_{2\beta} = K_\psi \cdot (\hat{i}_\alpha - i_\alpha)$$

As is evident from the above equations the correction terms $\upsilon_2$ are formed such that in the equations (3a) and (4a) in the one phase they are formed by way of the difference between computed and measured currents of the other phase. The variables $K_i$ und $K_\psi$ at the same time in each case form a constant factor.

Figure 4:
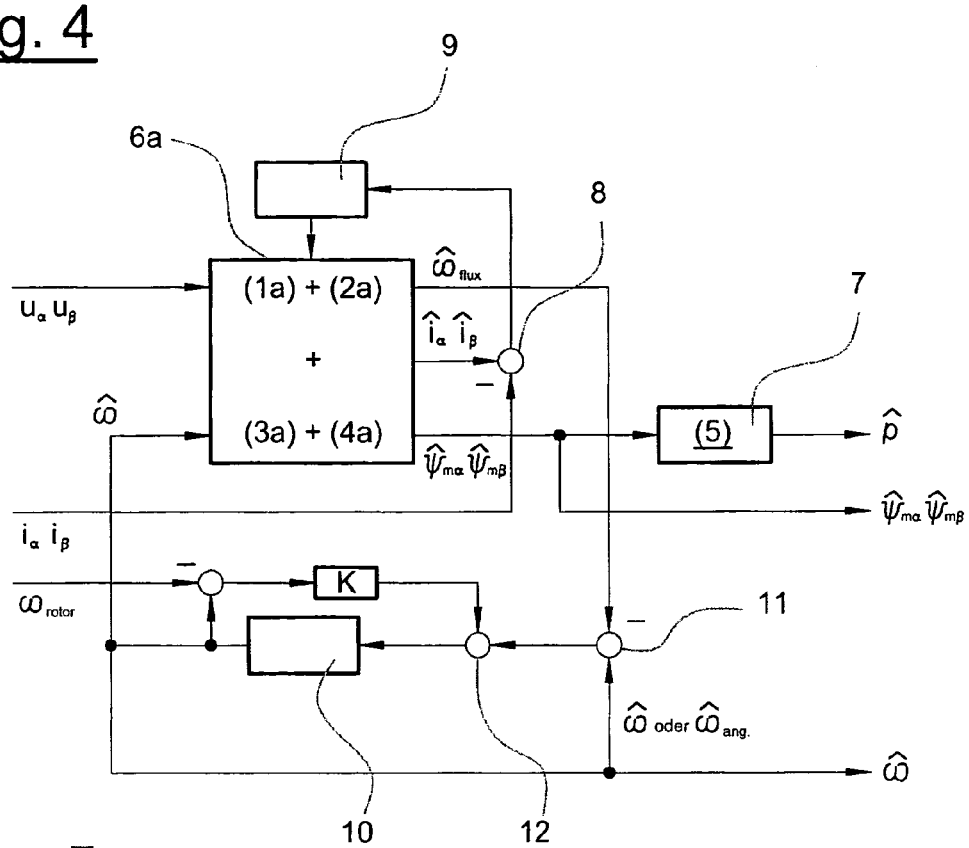
FIG. 4 is a schematic view of still another embodiment showing a rotational speed of rotor $\omega$ evaluated by calculation.

By way of example in FIG. 4 there is shown a further embodiment of the method according to the invention with which apart from the corrected motor model 6a according to FIG. 3 there is shown a further development in which the rotational speed of the rotor ω is evaluated by calculation.

With the motor models according to the FIGS. 2 and 3 the rotor rotational speed ω is entered as an input variable. The rotational speed is then usually detected sensorically, and specifically preferably with the help of a Hall sensor, as this is also known per se.

There are however constellations with which the rotor rotational speed may also be determined by calculation or with which the sensorically determined readings are not sufficiently accurate or are temporally available only in comparatively large intervals. For these cases in a further development of the invention there is provided an adaptation block 10 which by way of a rotational speed correction term 11 in which the difference between an assumed or computed rotational speed and the flux speed $\omega_{flux}$ computed from the motor model 6a is formed, the evaluated rotational speed approximates the actual rotor speed until the rotational speed correction term 11 assumes the value zero. This correction term 11 is shown in FIG. 4 as a result of the subtractory junction effected in the node point 14 and proceeds from the assumption that the speed of the magnetic flux and the rotor speed must always agree. In the adaptation block 10 then the difference evaluated by way of the rotational speed correction term 11 where appropriate taking account of a correction factor is added to the previously evaluated rotational speed and is outputted as a new computed rotational speed. This new computed rotational speed then on the one hand is inputted into the motor model 6a and on the other hand appears at the node point 14 which on account of the new rotational speed inputted into the motor model 6a also obtains a new speed of the magnetic flux and by way of this emits a new rotational speed correction term 11 which again initiates the previously described approximation process by the adaptation block 10 until finally the correction term 11 assumes the value zero, thus the speed of the magnetic flux as is evaluated from the motor model 6a, and the rotor speed, thus the computed rotational speed of the rotor agree.

Within the motor model 6a the speed of the magnetic flux is formed by the derivative with respect to time of the evaluated position of the magnetic flux. If one thus differentiates the equation (5) with respect to time in or to obtain the speed of the magnetic flux and if one substitutes the equations (3a) and (4a) in this differentiated equation (5) then the speed of the magnetic flux results as follows:

$$\hat{\dot{p}} = \omega_{Flux} = \hat{\omega} + \frac{1}{p} \cdot \frac{v_{2\beta} \cdot \hat{\psi}_{m\alpha} - v_{2\alpha} \cdot \hat{\psi}_{m\beta}}{\hat{\psi}_{m\alpha}^2 + \hat{\psi}_{m\beta}^2} \quad \text{Equation (6)}$$

wherein $\frac{1}{p} \cdot \frac{v_{2\beta} \cdot \hat{\psi}_{m\alpha} - v_{2\alpha} \cdot \hat{\psi}_{m\beta}}{\hat{\psi}_{m\alpha}^2 + \hat{\psi}_{m\beta}^2}$ represents the rotational speed correction term 11

The adaptation block 10 forms part of an approximation process with which the assumed and computed rotational speed is brought into agreement with the actual rotor rotational speed with the help of the motor model 6a and the rotational speed correction term 11, until the rotational speed correction term becomes zero.

Additionally one may take into account the difference between the rotor rotational speed computed in the adaptation block 10 and a measured rotor rotational speed. Such an additional rotational speed correction term 15 is additively combined at the node point 12 with the rotational speed correction term 11, which as a formula is represented as follows:

$$\Delta\omega_{mess} = K_v \cdot (\hat{\omega} - \omega_{Rotor}) \text{ wherein} \quad \text{Equation (7)}$$

$\Delta\omega_{mess}$ forms the additional rotational speed correction term and $K_v$ a constant.

If no measured rotor rotational speed is available this additional rotational speed correction term 15 is equal to zero. $K_v$ represents an amplification factor with which this additional rotational speed 15 is inputted.

Figure 5:
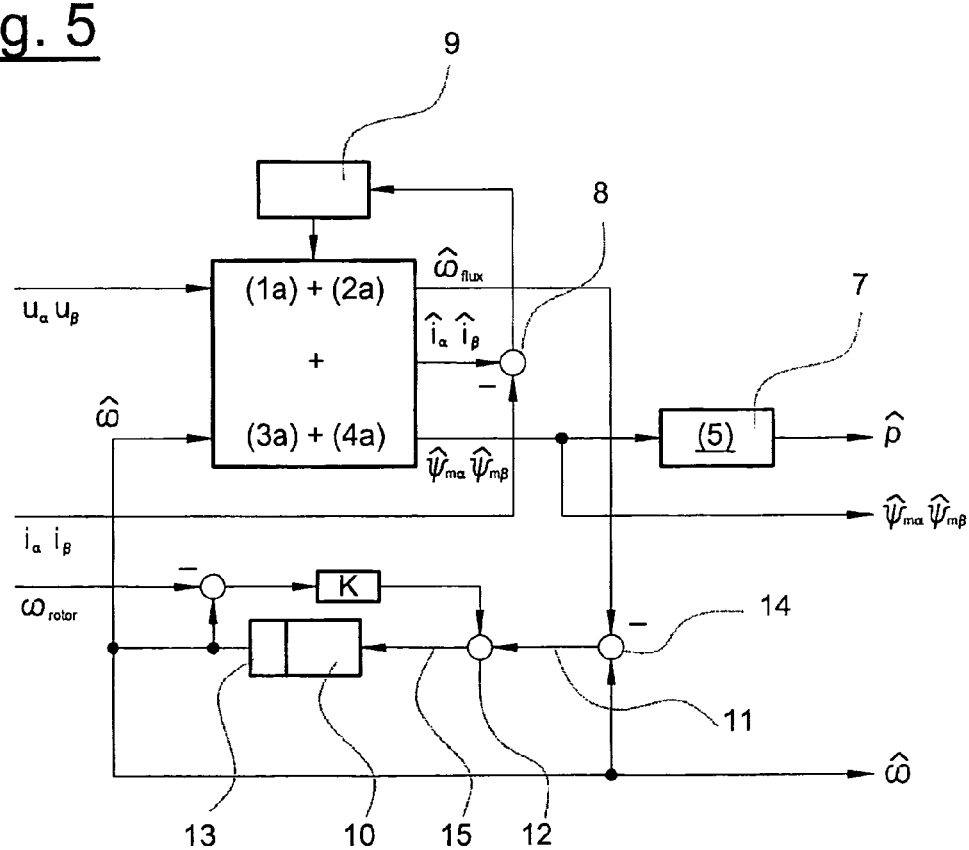
FIG. 5 is another embodiment of the invention.

According to FIG. 5 one may also determine the rotational speed by way of a system rotational speed change correction term 13 which may be derived from the rotational speed model. The method is different from that described previously by way of FIG. 4 in that apart from the adaptation block 10 there occurs a system rotational speed change correction term 13 derived from the rotational speed model.

The rotational speed model contains further information on mechanical relationships of the drive system. Usefully the change of the rotational speed, thus the temporal change in the rotor speed is expressed by a mechanical condition equation which takes into account the previously mentioned relationships. The change of the rotational speed may at the same time be taken into account by the following equation in the rotational speed model 13:

$$\dot{\omega} = \frac{1}{J} \cdot (M - M_L) \quad \text{Equation (8)}$$

in which M is the driving moment
$M_L$ the load moment
J the moment of inertia of the rotating load This condition equation which is known per se indicates that the change in rotational speed is only effected if the drive moment is larger than the load moment or vice versa, and that this change is then dependent on the difference moment as well as the moment of inertia of the rotating load.

This additional information in combination with the adaptation block 10 with a changing rotational speed leads to a quicker result with which the computed rotational speed of the rotor corresponds to the actual rotational speed of the rotor and is thus suitable in particular for tasks with a highly dynamic drive. The rotational speed model however assumes that corresponding mechanical or electrical variables are for example available by way of measurement or in another manner. At the same time, as the case may be, the rotational speed model may also simplified by skillfully met assumptions. If the motor for example runs at constant speed and the rotational speed model is used for determining the rotational speed the equation (8) results in zero so that then the rotational speed model is not used in its true sense but instead of this the rotational speed is evaluated as described by way of FIG. 4. The assumption that the motor runs at a constant rotational speed therefore does not go further than that described by way of FIG. 4.

The equation (8) may on the other hand be simplified by certain load assumptions, for example by the load condition $M_L=0$ or constant. The load moment is often not known or may only be determined with great difficultly. In many cases however one may assume a constant load moment. With this assumption the system rotational speed change correction term 13 then has the following form:

$$\Delta\omega_{System} = \frac{1}{J} \cdot (M - K_4) \text{ wherein} \quad \text{Equation (9)}$$

$\Delta\omega_{System}$—is the system change correction term and
$K_4$—the constant.

The constant $K_4$ is zero if the load moment is assumed to be zero. Otherwise the constant $K_4$ is to be previously determined for the respective unit type or application.

The drive moment is determined by the equation (10):

$$M = K_2 \cdot (\psi_{m\alpha} \cdot i_\beta - \psi_{m\beta} \cdot i_\alpha), \quad \text{Equation (10)}$$

in which $K_2$ is a constant.

The term in brackets in equation (10) is already known from the motor model 6a. If one substitutes equation (10) into equation (9) then it becomes evident that for this case (assumption that the load moment is zero or constant) the system change correction term 13 may be computed from the motor model 6a. Thus without further measurement one may determine this correction term 13 and compute the rotational speed of the rotor more quickly and accurately. It is thus particularly favorable if the drive moment may be determined from the variables deduced from the motor model 6a.

If the motor for example is applied in a centrifugal pump unit then the load moment may be determined by calculation in a simple manner since it is evaluated by the equation (11):

$$M_L = K_1 \cdot \omega^2, \quad \text{Equation (11)}$$

in which $K_1$ is a constant, which provides a relationship for the rotor rotational speed. Here too the variables derived from the motor model may be entered into the rotational speed model without further mechanical or electrical measurements being required.

Irrespective of whether the rotational speed is only determined by way of the adaptation model 10 or supplementary to this also by taking into account the rotational speed model, a measured rotational speed may also be inputted in order to obtain the result more quickly or to increase the accuracy of the computed values. Such a quick and accurate acquisition of the motor operation variables as may be effected by way of the previously mentioned inventive method is a precondition for a dynamic and stable activation of the motor.

For those models where rotational speed is sensed, such sensing may be done with a Hall sensor by way of example.

The previously described methods may be implemented into digital motor electronics without further ado. The continuous detection and storage of the corresponding electrical values of the motor, thus of the motor currents and voltages today belongs to the state of art applied today. This data thus on the control side is available anyway so that the present invention, as the case may be, may be used within the digital motor control in order to improve this.

For ease of reference, a list of reference numerals and part numbers for FIGS. 1–5 are as follows:

1—stator
2—rotor
3—coil
4—coil
5—permanent magnet
6—motor model
7—angle calculator
8—junction
9—correction term
α—direction
β—direction
N—north pole of the magnet
S—south pole of the magnet
10—adaptation block
11—rotational speed correction term
12—node point
13—system rotational speed correction term
14—node point
15—additional rotational speed correction term While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A motor system comprising:
   a rotor;
   a stator;
   a control for detecting a magnetic flux, a rotor position and/or a rotational speed of said rotor in a single- or multi-phase permanent magnet motor or -synchronous motor or -generator using the stator voltage equations:

$$L \cdot \dot{i}_\alpha = -R \cdot i_\alpha + p \cdot \omega \cdot \psi_{m\beta} + u_\alpha \quad \text{Equation (1)}$$

$$L \cdot \dot{i}_\beta = -R \cdot i_\beta - p \cdot \omega \cdot \psi_{m\alpha} + u_\beta \quad \text{Equation (2)}$$

in which
   L is the inductance
   $i_\alpha$ a current in the direction α
   $i_\beta$ a current in the direction β
   $\dot{i}_\alpha$ a derivative with respect to time of the current in the direction α
   $\dot{i}_\beta$ a derivative with respect to time of the current in direction of β
   R an ohmic resistance
   p pole pair number
   ω a rotational speed of the rotor
   $\psi_{m\alpha}$ a magnetic flux in the direction α
   $\psi_{m\beta}$ a magnetic flux in the direction β
   $u_\alpha$ a voltage in direction α
   $u_\beta$ a voltage in the direction β
wherein the evaluations, an energy conditions of the rotor are also taken into account.

2. The motor system according to claim 1, wherein said energy conditions in a magnet of said rotor are taken into account by way of the following energy equations of the rotor:

$$\dot{\psi}_{m\alpha} = -p \cdot \omega \cdot \psi_{m\beta} \quad \text{Equation (3)}$$

$$\dot{\psi}_{m\beta} = p \cdot \omega \cdot \psi_{m\alpha} \quad \text{Equation (4)}$$

wherein
   $\dot{\psi}_{m\alpha}$ is the derivative with respect to time of $\psi_{m\alpha}$ and
   $\dot{\psi}_{m\beta}$ is the derivative with respect to time of $\psi_{m\beta}$.

3. The motor system according to claim 1, wherein the motor model defined by the equations (1) to (4) is corrected in dependence on a comparison between computed model values (^) and measured electrical and/or mechanical values by way of at least one correction term (9), so that there results the following equations:

$$L \cdot \dot{i}_\alpha = -R \cdot i_\alpha + p \cdot \omega \cdot \psi_{m\beta} + u_\alpha + \upsilon_{1\alpha} \quad \text{Equation (1a)}$$

$$L \cdot \dot{i}_\beta = -R \cdot i_\beta - p \cdot \omega \cdot \psi_{m\alpha} + u_\beta + \upsilon_{1\beta} \quad \text{Equation (2a)}$$

$$\dot{\psi}_{m\alpha} = -p \cdot \omega \cdot \psi_{m\beta} + \upsilon_{2\alpha} \quad \text{Equation (3a)}$$

$$\dot{\psi}_{m\beta} = p \cdot \omega \cdot \psi_{m\alpha} + \upsilon_{1\beta} \quad \text{Equation (4a)}$$

in which $\upsilon_{1\alpha}$, $\upsilon_{1\beta}$, $\upsilon_{2\alpha}$, $\upsilon_{1\beta}$ are correction terms.

4. The motor system according to claim 3, wherein the measured electrical values are the motor currents.

5. The motor system according to claim 3, wherein the correction terms (9) are in each case formed from a correction factor and the difference between measured and computed motor currents.

6. The motor system according to claim 3, wherein the correction terms (9) in the equations (3a) and (4a) in the one phase are formed by way of the difference between measured and computed currents of the other phase, wherein the correction term is introduced into equation (3a) with a negative polarity.

7. The motor system according to claim 1, wherein said rotational speed is detected sensorically.

8. The motor system according to claim 7, wherein said rotational speed is determined with the help of a Hall sensor.

9. The motor system according to claim 1, wherein the rotational speed is evaluated by calculation in a manner such that a difference between the flux speed and an assumed rotor speed or variables derived therefrom is formed as a rotational speed correction term (11) and the actual rotational speed is evaluated by way of an approximation process.

10. The motor system according to claim 9, wherein said rotational speed correction term (11) is corrected by way of a rotational speed measurement.

11. The motor system according to claim 1, wherein the assumed rotor rotational speed by way of a rotational speed correction term (11) is adapted in an adapter block to the actual rotational speed.

12. The motor system according to claim 1, wherein the assumed rotational speed by way of a rotational speed correction term (11) is adapted in a rotational speed model to the actual rotational speed.

13. The motor system according to claim 1, wherein for evaluating the flux speed one determines the position of the magnetic flux and specifically by way of the equation $$\rho = \frac{1}{p} \cdot \text{Arctg}\left(\frac{\psi m\beta}{\psi m\alpha}\right). \quad \text{Equation (5)}$$

14. The motor system according to claim 1, wherein the equation (5) is differentiated with respect to time and the equations (3a) and (4a) (for calculated evaluation of the rotational speed) are substituted into the differentiated equation (5).

15. The motor system according to claim 1, wherein in a rotational speed model is used comprising a derivative of the first order with respect to time.

16. The motor system according to claim 15, wherein a rotational speed model is formed by a mechanical condition equation preferably of the form:

$$\dot\omega = \frac{1}{J} \cdot (M - M_L), \quad \text{Equation (8)}$$

M is the driving moment,
$M_L$ a load moment, and
J a moment of inertia of the rotating load.

17. The motor system according to claim 16, wherein the load moment is set to zero.

18. The motor system according to claim 17, wherein the drive moment is set to zero.

19. The motor system according to claim 1, wherein the load moment is formed by $$M_L = K_1 \cdot \omega^2, \quad \text{Equation (11)}$$

in which $K_1$ is a constant.

20. The motor system according to claim 1, wherein the drive moment is defined by $$M = K_2 \cdot (\omega_{m\alpha} \cdot i_\beta - \omega_{m\beta} \cdot i_\alpha), \quad \text{Equation (10)}$$

in which $K_2$ is a constant.

* * * * *